(12) United States Patent
Matsuno et al.

(10) Patent No.: US 8,976,293 B2
(45) Date of Patent: Mar. 10, 2015

(54) ELECTRONIC APPARATUS, CONTROL METHOD OF ELECTRONIC APPARATUS, AND CONTROL PROGRAM OF ELECTRONIC APPARATUS

(71) Applicant: Kabushiki Kaisha Toshiba, Minato-ku, Tokyo (JP)

(72) Inventors: Takaya Matsuno, Kunitachi (JP); Koji Yamamoto, Ome (JP); Takashi Sudo, Fuchu (JP); Chikashi Sugiura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/777,517

(22) Filed: Feb. 26, 2013

(65) Prior Publication Data

US 2013/0314596 A1    Nov. 28, 2013

(30) Foreign Application Priority Data

May 25, 2012    (JP) .................................. 2012-120110

(51) Int. Cl.
*H04N 11/00*    (2006.01)
*H04N 7/088*    (2006.01)
*G11B 27/28*    (2006.01)
*H04N 5/445*    (2011.01)
*H04N 21/44*    (2011.01)
(Continued)

(52) U.S. Cl.
CPC .............. *H04N 7/0882* (2013.01); *G11B 27/28* (2013.01); *H04N 5/44508* (2013.01); *H04N 21/44008* (2013.01); *H04N 21/4882* (2013.01); *H04N 21/4884* (2013.01); *G06F 17/30784* (2013.01); *G06F 17/30743* (2013.01)
USPC ............................ 348/462; 348/465; 348/468

(58) Field of Classification Search
USPC ........ 348/462–476; 382/176, 182; 725/32–36
See application file for complete search history.

(56) References Cited

U.S. PATENT DOCUMENTS 5,311,311 A * 5/1994 Harigai et al. ................ 348/476
6,219,382 B1 * 4/2001 Kikuchi et al. .......... 375/240.16
(Continued)

FOREIGN PATENT DOCUMENTS

JP    2001-118297        4/2001
JP    2002-335490 A    11/2002
(Continued)

OTHER PUBLICATIONS (Murata Mitsuhiro Ito Hideki, DVD Player, Nov. 22, 2002, Alpine Electronics Inc); Machine translation of JP 2002-335490A.*
(Continued)

*Primary Examiner* — Jefferey Harold
*Assistant Examiner* — Humam Satti
(74) *Attorney, Agent, or Firm* — Knobbe, Martens, Olson & Bear LLP

(57) ABSTRACT

One embodiment provides an electronic apparatus, including: a first detector configured to attempt to detect a telop and a warning sound from a received video content at a first image reading interval and a first sound reading interval, respectively; and a second detector configured to attempt, upon a detection of at least one of a telop and a warning sound by the first detector, to detect a telop and a warning sound from the video content at a second image reading interval and a second sound reading interval which are shorter than the first image reading interval and the first sound reading interval, respectively.

8 Claims, 7 Drawing Sheets

(51) Int. Cl.
*H04N 21/488* (2011.01)
*G06F 17/30* (2006.01)

(56) References Cited

U.S. PATENT DOCUMENTS

| | | | |
|---|---|---|---|
| 7,817,856 B2 * | 10/2010 | Yoshii et al. | 382/182 |
| 2002/0051081 A1 * | 5/2002 | Hori et al. | 348/553 |
| 2004/0228616 A1 * | 11/2004 | Miyasato et al. | 386/83 |
| 2006/0274197 A1 * | 12/2006 | Yoo | 348/465 |
| 2010/0079673 A1 * | 4/2010 | Yamamoto et al. | 348/571 |
| 2010/0080531 A1 * | 4/2010 | Watanabe et al. | 386/95 |
| 2010/0098393 A1 * | 4/2010 | Murabayashi | 386/124 |
| 2011/0109795 A1 * | 5/2011 | Inamura et al. | 348/441 |
| 2011/0243526 A1 * | 10/2011 | Hiroi et al. | 386/241 |
| 2012/0019717 A1 * | 1/2012 | Mase | 348/468 |
| 2013/0100346 A1 * | 4/2013 | Otsuka et al. | 348/462 |

FOREIGN PATENT DOCUMENTS

| | | |
|---|---|---|
| JP | 2002-374219 | 12/2002 |
| JP | 3095205 U | 7/2003 |
| JP | 2003-333424 | 11/2003 |
| JP | 2004-072617 | 3/2004 |
| JP | 2006-157373 A | 6/2006 |
| JP | 2009-017325 | 1/2009 |

OTHER PUBLICATIONS

Notification of Reasons for Refusal mailed by Japan Patent Office on Apr. 30, 2013 in the corresponding Japanese patent application No. 2012-120110—7 pages.

* cited by examiner

ELECTRONIC APPARATUS, CONTROL METHOD OF ELECTRONIC APPARATUS, AND CONTROL PROGRAM OF ELECTRONIC APPARATUS

CROSS-REFERENCE TO RELATED APPLICATION(S)

This application claims priority/priorities from Japanese Patent Application No. 2012-120110 filed on May 25, 2012, the entire contents of which are incorporated herein by reference.

FIELD

Embodiments described herein relate generally to an electronic apparatus, a control method of an electronic apparatus, and a control program of an electronic apparatus.

BACKGROUND

In recent years, electronic apparatus which enable viewing of, for example, recorded programs and video contents etc. (hereinafter referred to as video contents) distributed over the Internet or the like have come into wide use.

When a video content is reproduced by such an electronic apparatus and viewed, the video content may contain a prompt report such as a news flash or an earthquake early warning. However, if, for example, such a video content is reproduced after a lapse of a certain period from its broadcast, the prompt report contained therein is meaningless. If, for example, a telop is displayed or a warning sound is output, it may be an obstruction to viewing of the video content by the user. It is desired to lower the degree of obstruction to viewing of a video content by a prompt report contained therein.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

One embodiment provides an electronic apparatus, including: a first detector configured to attempt to detect a telop and a warning sound from a received video content at a first image reading interval and a first sound reading interval, respectively; and a second detector configured to attempt, upon a detection of at least one of a telop and a warning sound by the first detector, to detect a telop and a warning sound from the video content at a second image reading interval and a second sound reading interval which are shorter than the first image reading interval and the first sound reading interval, respectively.

Embodiments will be hereinafter described with reference to the drawings.

Figure 1A:
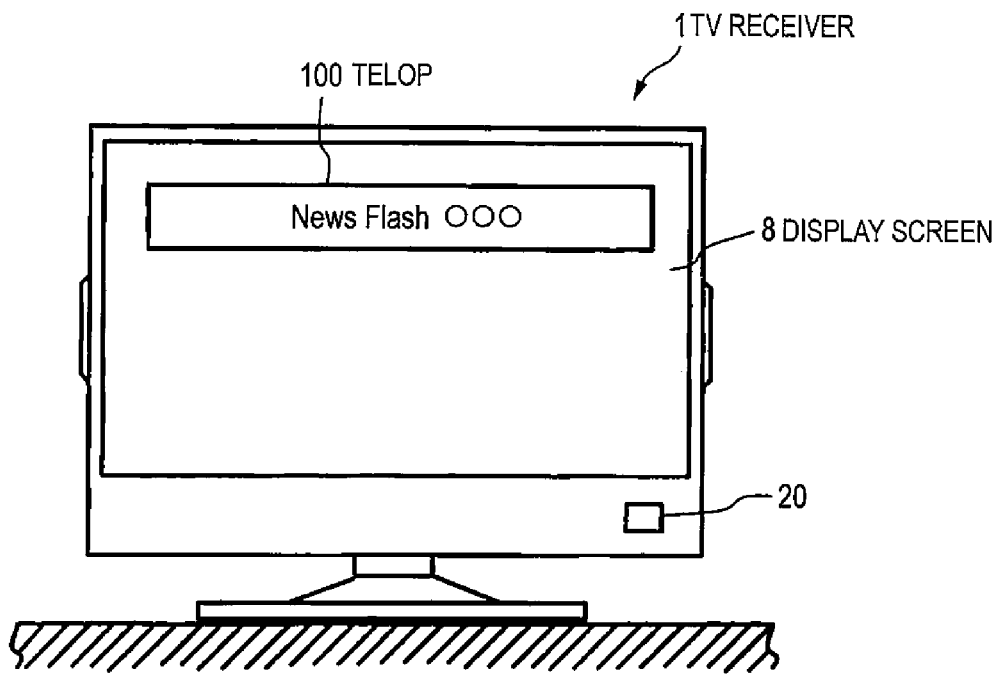
FIGS. 1A and 1B show appearances of a TV receiver (electronic apparatus) according to an embodiment and illustrate how a telop comes not to be displayed thereon by isolation processing.
Figure 1B:
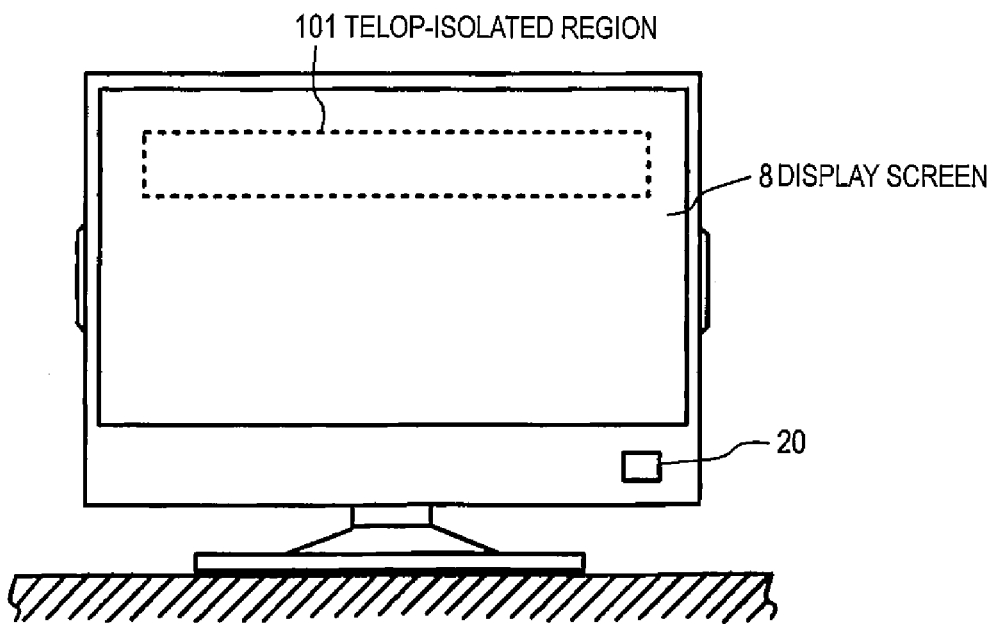

FIGS. 1A and 1B show appearances of a TV receiver (electronic apparatus) 1 according to an embodiment and illustrate how a telop comes not to be displayed thereon by isolation processing.

For example, as shown in FIG. 1A, a recorded video content contains a telop 100 "News flash ○○○" and it is displayed as part of an image. In the embodiment, as described later, the telop 100 is isolated and a resulting video content is displayed (see FIG. 1B).

In the embodiment, a telop contained in an image of a recorded video content, for example, is detected and isolated from the video content and a telop-isolated image of the video content is displayed.

Furthermore, in the embodiment, a warning sound contained in a sound of a recorded video content, for example, is detected and isolated from the video content and a warning-sound-isolated sound of the video content is output.

Although the embodiment is directed to the TV receiver as an example electronic apparatus, the concept of the embodiment can also be applied to personal computers (PCs) such as tablet PCs, smartphones, cell phones, etc.

Figure 2:
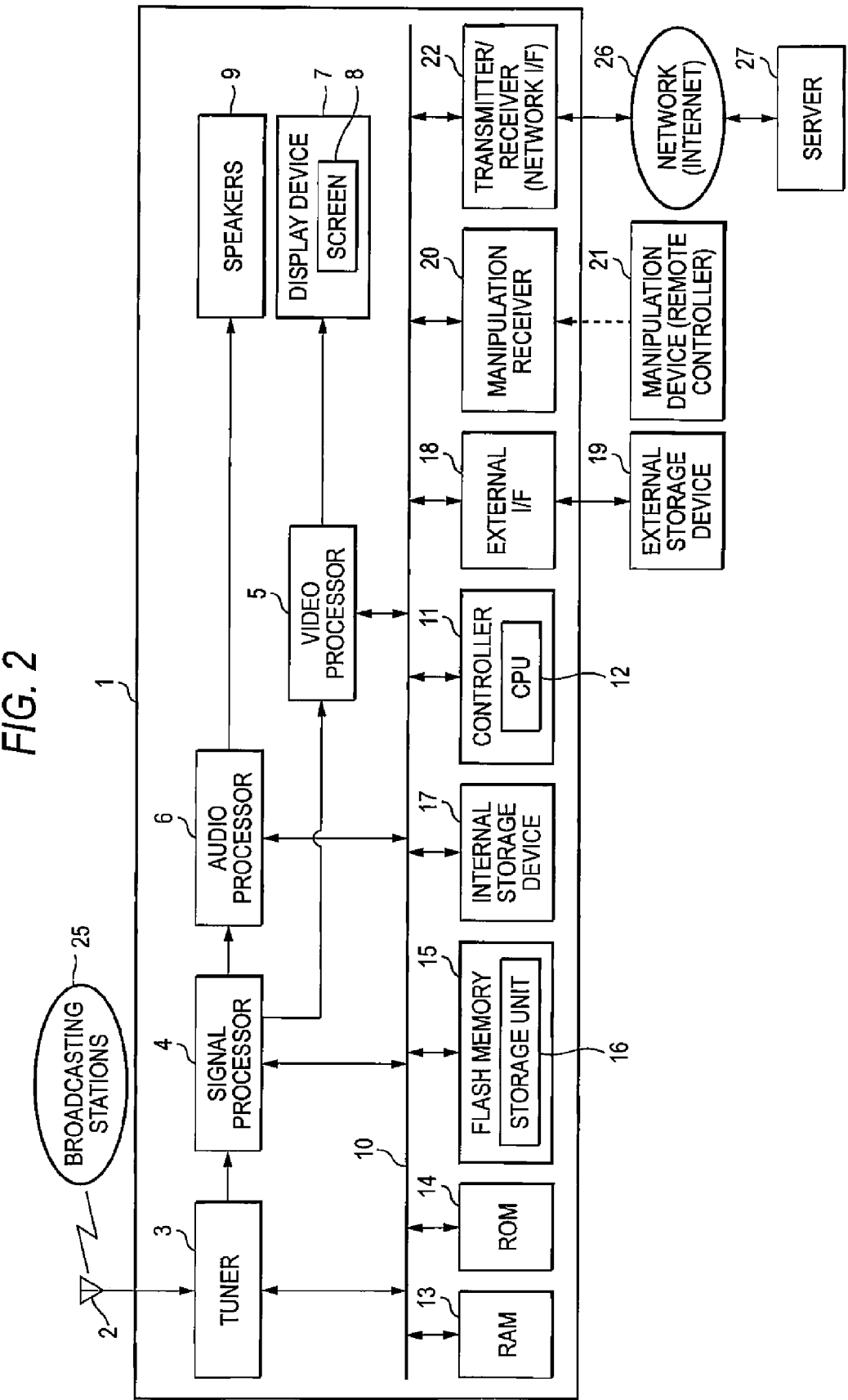
FIG. 2 shows an example configuration of the TV receiver.

FIG. 2 shows an example configuration of the TV receiver 1 according to the embodiment. For example, as shown in FIG. 2, the TV receiver 1 is equipped with an antenna 2, a tuner 3, a signal processor 4, a video processor 5, an audio processor 6, a display device 7 having a display screen 8, speakers 9, a bus 10, a controller 11 having a CPU 12, a RAM 13, a ROM 14, a flash memory 15 having a storage unit 16, a an internal storage device 17, an external interface 18, a manipulation receiver 20, and a transmitter/receiver (network interface) 22.

An external storage device 19 is connected to the TV receiver 1 through the external interface 18. A user manipulates a remote controller 21, for example. A remote control signal that is output from the remote controller 21 is received by the manipulation receiver 20 of the TV receiver 1. The TV receiver 1 is connected to a server 27, via a network (Internet) 26. The TV receiver 1 can receive an Internet broadcast, for example, over the network 26.

The controller 11 is equipped with the CPU 12 and controls the TV receiver 1. The RAM 13, the ROM 14, and the flash memory 15 are used for, for example, processing which is performed by the controller 11.

For example, video contents are broadcast from broadcasting stations 25 by digital broadcast. A tuner 3 receives the broadcast video contents and tunes in to one of them. A digital signal of the selected video content is supplied to the signal processor 4.

The signal processor 4 performs signal processing on the received digital signal of the video content and supplies a resulting audio signal and video signal to the audio processor 6 and the video processor 5, respectively.

The audio processor 6 performs audio processing on the received audio signal of the video content and supplies resulting audio signals to the speakers 9. The speakers 9 output a sound on the basis of the received audio signals.

The video processor 5 performs video processing on the received video signal of the video content and supplies a resulting video signal to the display device 7. The display device 7 displays video on the display screen 8 of, for example, an LCD panel (video display unit) on the basis of the received video signal.

In the embodiment, the TV receiver 1 is equipped with the internal storage device 17 and can record the received video content therein.

In the embodiment, the external storage device 19 is USB or LAN-connected to the TV receiver 1. The TV receiver 1 can also record the received video content in the external storage device 19.

A user manipulation is performed on the TV receiver 1 using a manipulation device such as the remote controller 21 (mentioned above).

The above-described pieces of processing are controlled by the controller 11.

As described above, the TV receiver 1 is connected to the server 27 through the transmitter/receiver (network interface) 22 and can receive an Internet broadcast, for example.

Figure 3:
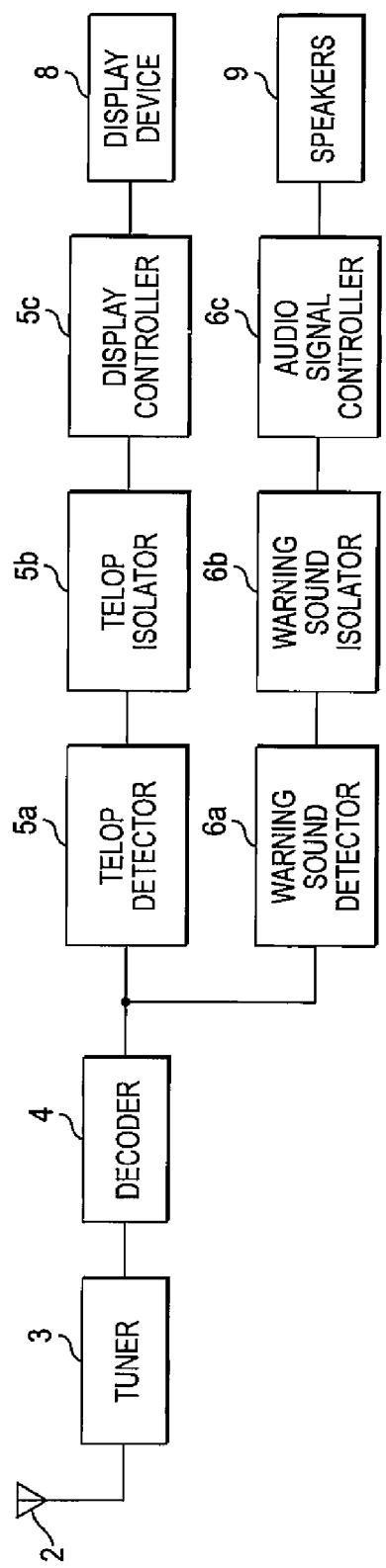
FIG. 3 shows an example functional configuration for detection and isolation of a telop and a warning sound which are performed by the TV receiver.

FIG. 3 shows an example functional configuration for detection and isolation of a telop and a warning sound which are performed by the TV receiver 1 according to the embodiment. Video data and audio data that have been received by the antenna 2 and processed by the tuner 3 and a decoder (signal processor) 4 are input to a telop detector 5a and a warning sound detector 6a, respectively.

As shown in FIG. 2, video data and audio data of a video content recorded in, for example, the internal storage device 17 or the external storage device 19 are also input to a telop detector 5a and a warning sound detector 6a, respectively.

The telop detector 5a detects a telop, if any, and supplies a detection result and the video data to a telop isolator 5b. A telop may be detected by referring to the technique disclosed in JP-2009-017325-A, for example.

The telop isolator 5b isolates a telop if it is contained in the video data. A telop may be isolated by referring to the technique disclosed in JP-2003-333424-A, for example.

The telop isolator 5b passes telop-isolated video data to a display controller 5c, and the display controller 5c displays the telop-isolated video data on the display device 7.

Figure 6:
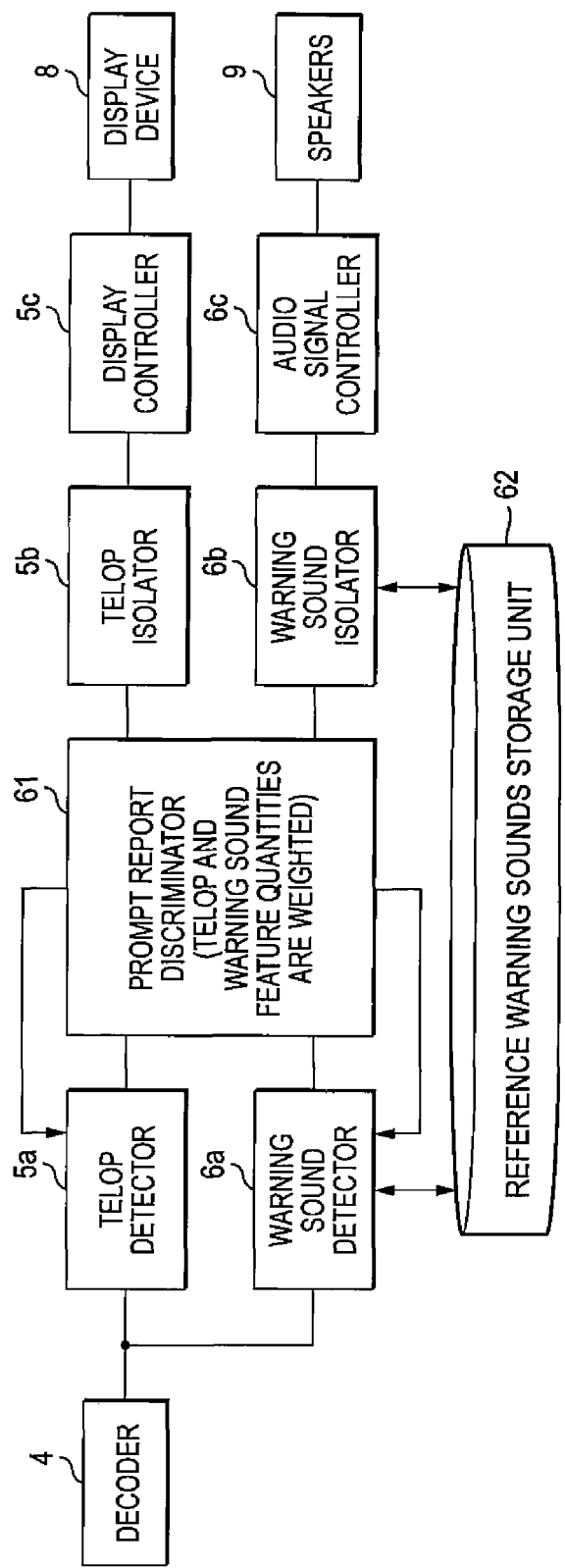
FIG. 6 shows an example configuration of a TV receiver according to another embodiment.

On the other hand, the warning sound detector 6a detects a warning sound, if any, through matching using reference warning sounds stored in advance (see FIG. 6). The warning sound detector 6a supplies a detection result and the audio data to a warning sound isolator 6b.

The warning sound isolator 6b isolates a warning sound using an adaptive filter, for example, if it is contained in the audio data. The warning sound isolator 6b supplies warning-sound-isolated audio data to an audio signal controller 6c.

The audio signal controller 6c causes the speakers 9 or the like to reproduce (output) the audio data.

Figure 4:
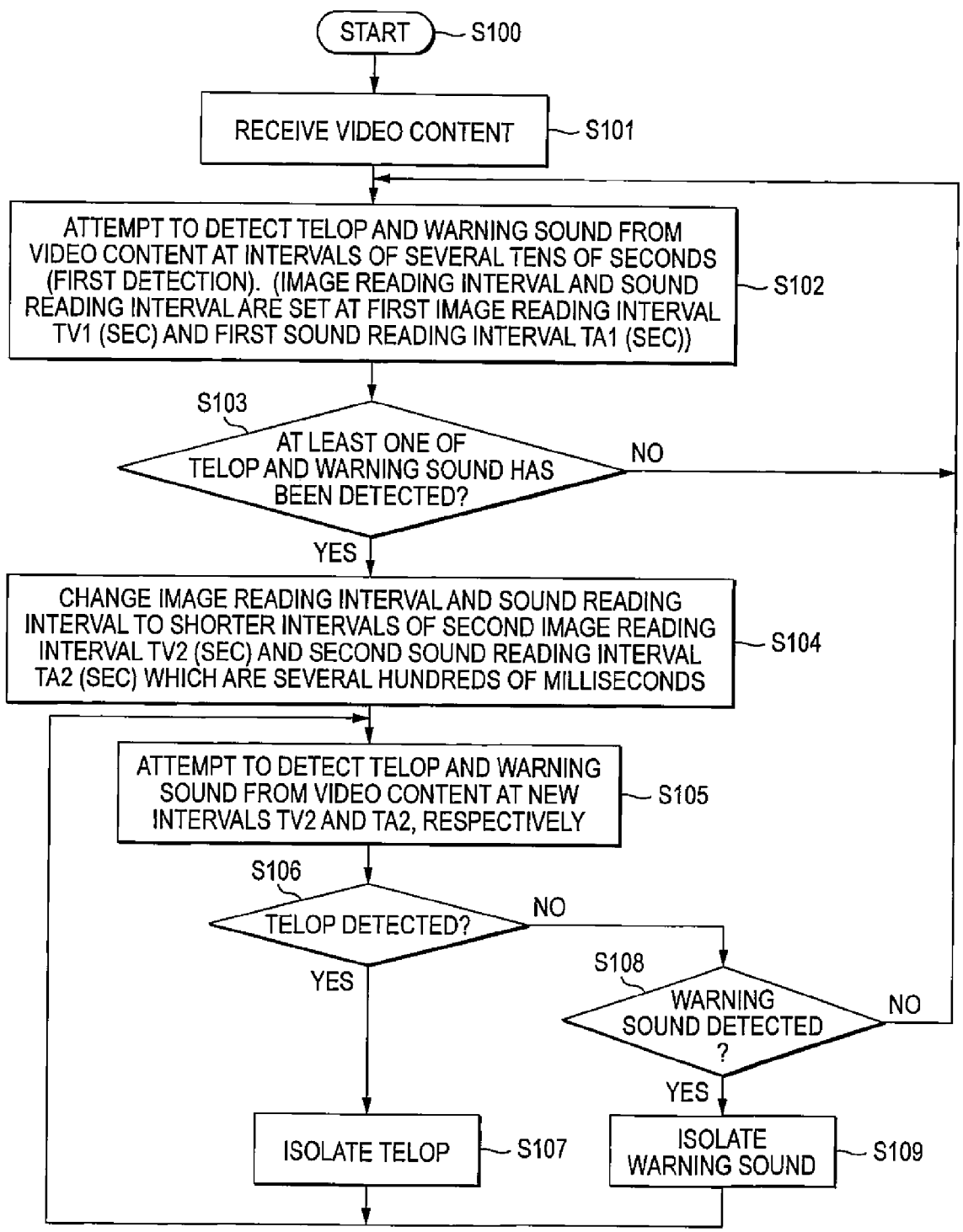
FIG. 4 shows a general process of detecting and isolating a telop and a warning sound in the TV receiver.

FIG. 4 shows a general process of detecting and isolating a telop and a warning sound in the TV receiver 1 according to the embodiment. The process starts at step S100. At step S101, a video content is received in the above-described manner.

At step S102, it is attempted to detect a telop and a warning sound from the video content at intervals of several tens of seconds (first detection). At this step, the image reading interval is set at a first image reading interval TV1 sec and the sound reading interval is set at a first sound reading interval TA1 sec.

At step S103, it is judged whether at least one of (i.e., one or both of) a telop and a warning sound has been detected. If it is judged that at least one of a telop and a warning sound has been detected (S103: yes), the process moves to step S104. If it is judged that neither a telop nor a warning sound has been detected (S103: no), the process returns to step S102.

At step S104, the image reading interval and the sound reading interval are changed from TV1 and TA1 to shorter intervals of a second image reading interval TV2 sec and a second sound reading interval TA2 sec which are several hundreds of milliseconds, for example.

At step S105, it is attempted to detect a telop and a warning sound from the video content at the new intervals TV2 and TA2 (second detection), respectively.

At step S106, it is judged whether a telop has been detected or not (intervals: TV2 and TA2). If it is judged that a telop has been detected (S106: yes), the process moves to step S107. If not (S106: no), the process moves to step S108.

At step S107, the telop detected from the image of the video content is isolated in the above-described manner. Then, the process returns to step S105.

At step S108, it is judged whether a warning sound has been detected or not. If it is judged that a warning sound has been detected (S108: yes), the process moves to step S109. If not (S108: no), the process returns to step S102.

At step S109, the warning sound detected from the video content is isolated in the above-described manner. Then, the process returns to step S105.

Figure 5:
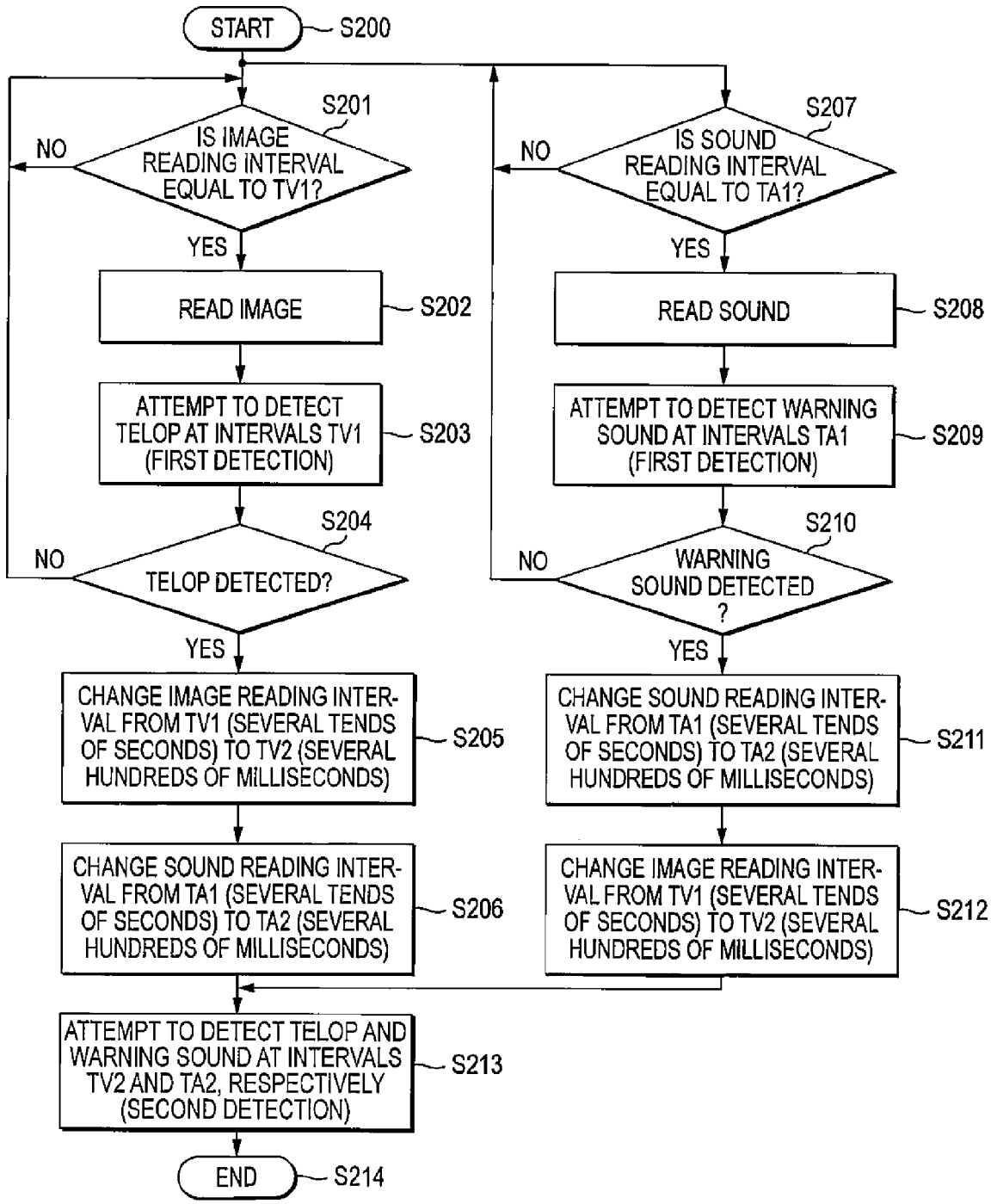
FIG. 5 shows a detailed process of detecting and isolating a telop and a warning sound in the TV receiver.

FIG. 5 shows a detailed process of detecting and isolating a telop and a warning sound in the TV receiver 1 according to the embodiment. The process starts at step S200. Then, the process moves to steps S201 and S207.

At step S201, it is judged whether or not the image reading interval is equal to TV1. If it is judged that the image reading interval is equal to TV1 (S201: yes), the process moves to step S202. If not (S201: no), step S201 is executed again.

An image is read at step S202. At step S203, it is attempted to detect a telop at intervals TV1 (first detection).

At step S204, it is judged whether a telop has been detected or not. If it is judged that a telop has been detected (S204: yes), the process moves to step S205. If not (S204: no), the process returns to step S201.

At step S205, the image reading interval is changed from TV1 (several tens of seconds) to TV2 (several hundreds of milliseconds).

At step S206, the sound reading interval is changed from TA1 (several tens of seconds) to TA2 (several hundreds of milliseconds).

At step S207, it is judged whether or not the sound reading interval is equal to TA1. If it is judged that the sound reading interval is equal to TA1 (S207: yes), the process moves to step S208. If not (S207: no), step S207 is executed again.

A sound is read at step S208. At step S209, it is attempted to detect a warning sound at intervals TA1 (first detection).

At step S210, it is judged whether a warning sound has been detected or not. If it is judged that a warning sound has been detected (S210: yes), the process moves to step S211. If not (S210: no), the process returns to step S207.

At step S211, the sound reading interval is changed from TA1 (several tens of seconds) to TA2 (several hundreds of milliseconds).

At step S212, the image reading interval is changed from TV1 (several tens of seconds) to TV2 (several hundreds of milliseconds).

At step S213, it is attempted to detect a telop and a warning sound at intervals TV2 and TA2, respectively. The process is finished at step S214.

As described above, in the embodiment, if at least one of a telop and a warning sound is detected by the first detection (steps S203 and S209), both of the image reading interval and the sound reading interval are changed to shorter intervals and it is attempted to detect both of a telop (interval: TV2) and a warning sound (interval: TA2) (second detection).

That is, in the embodiment, as described above, it is attempted to detect a flash telop and a warning sound in different manners during an ordinary operation and during an operation that is dedicated to detection. For example, as described above, the image reading interval and the sound reading interval are changed.

If a flash telop is detected while it is being attempted to detect a telop at the first image reading interval, the image reading interval and the sound reading interval are changed to predetermined values. Likewise, if a warning sound of a prompt report is detected while it is being attempted to detect a warning sound at the first image reading interval, the image reading interval and the sound reading interval are changed.

Controlling the detection of a warning sound using a telop detection result and controlling the detection of a telop using a warning sound detection result make it possible to reduce the amount of processing while maintaining detection performance.

FIG. 6 shows an example configuration of a TV receiver according to another embodiment. In this embodiment, a prompt report discriminator 61 judges presence/absence of a prompt report by checking detection results of both of the telop detector 5a and the warning sound detector 6a and controlling the telop detector 5a and the warning sound detector 6a on the basis of those detection results.

For example, to suppress a failure of detection, if a telop or a warning sound is detected, the prompt report discriminator 61 changes parameters of both of the telop detection and the warning sound detection. If a telop or a warning sound is detected using the new parameters, the prompt report discriminator 61 judges that a prompt report is being broadcast and hence causes telop isolation or warning sound isolation.

As shown in FIG. 6, a reference warning sounds storage unit 62 is stored in advance with reference warning sounds to be used by the warning sound detector 6a, for example.

In the embodiment, presence/absence of a prompt report is judged using results of both of flash telop detection and warning sound detection. For example, if a prompt report candidate is detected, the prompt report discriminator 61 calculates a time average $Xv/Td$ of a telop detection feature quantity $Xv$ and a time average $Ya/Td$ of a warning sound detection feature quantity $Ya$ over a certain interval $Td$. And the prompt report discriminator 61 averages the two time averages using weights a and b, that is, calculates $(aXv+bYa)/2Td$. If this value is larger than or equal to a certain threshold value Th, the prompt report discriminator 61 judges that a prompt report exists. With the above measure, a failure of detection can be suppressed.

Furthermore, it becomes possible to suppress a failure of detection even in a program containing many telops, a program (e.g., musical program) containing sounds that are similar to warning sounds, and like programs.

Figure 7:
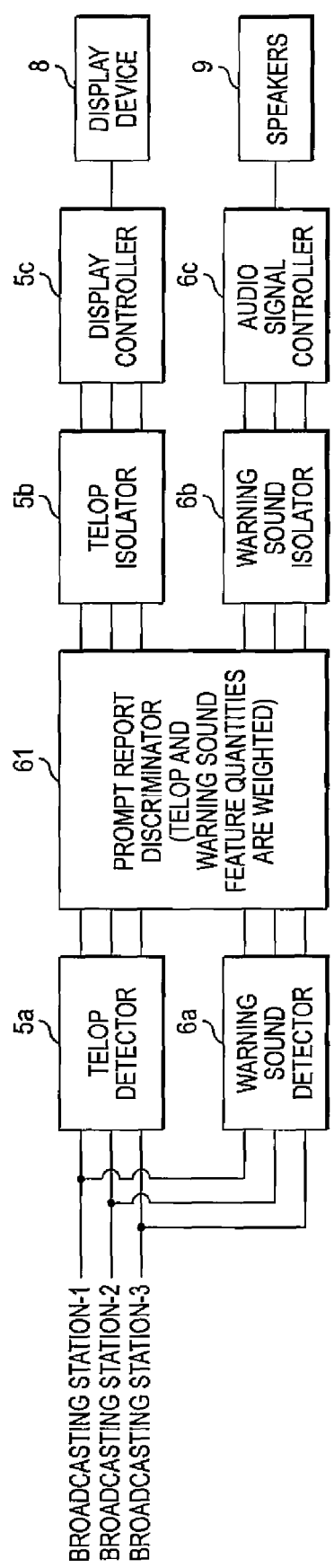
FIG. 7 shows an example configuration of a TV receiver according to a still another embodiment.

FIG. 7 shows an example configuration of a TV receiver according to a still another embodiment. In this embodiment, broadcasts from plural broadcasting stations are used for detection of a telop and a warning sound. A prompt report discriminator 61' judges whether a prompt report is being broadcast or not after the telop detector 5a and the warning sound detector 6a have performed detecting operations.

For example, one value is calculated from all broadcast signals by changing weights depending on the presence/absence of a telop and a warning sound. If the calculated value is larger than or equal to a preset threshold value, it is judged that a prompt report is being broadcast and prompt report isolation processing is performed for a specified station or all the stations.

That is, in this embodiment, to suppress erroneous detection and a failure of detection and increase robustness, it is checked whether or not a news flip is being broadcast from plural broadcasting stations.

For example, whether a telop exists is judged by comparing telop detection feature quantities $Xv1, Xv2, \ldots$ calculated for respective broadcasting stations with a telop detection threshold value Thv, and whether a warning sound exists is judged by comparing warning sound detection feature quantities $Ya1, Ya2, \ldots$ calculated for the respective broadcasting stations with a warning sound detection threshold value Tha.

For a broadcasting station S, feature quantities $XvS'$ and $YaS'$ are calculated according to a flag TSflag indicating presence/absence of a telop and a flag ASflag indicating presence/absence of a warning sound. More specifically, feature quantities $XvS'$ and $YaS'$ are calculated by multiplying feature quantities $XvS$ and $YaS$ by a large weight Wa if both flags TSflag and ASflag are set and by a small weight Wb if neither of the flags TSflag and ASflag is set.

Resulting feature quantities $Xv1', Xv2', \ldots$ and $Ya1', Ya2', \ldots$ are averaged. If a resulting average is larger than or equal to a threshold value Th, it is judged that a prompt report is being broadcast from the plural broadcasting stations.

The above processing makes it possible to suppress not only a failure of detection but also erroneous detection of a prompt report. Furthermore, a prompt report can be detected for plural broadcasting stations.

It is expected that the detection performance of warning sound detection is lowered for certain kinds of programs such as a musical program. In view of this, in the case of warning sound detection, a program genre may be obtained from an EPG or the like to introduce reliability of the genre.

A feature quantity $Ya$ of warning sound detection is multiplied by a weight coefficient Wa that depends on the reliability of a program genre. Warning sound detection for a news program is relatively high in reliability, and warning sound detection for a musical program or the like which may contain signals similar to warning sounds is low is reliability. This makes it possible to suppress erroneous detection while suppressing increase in the amount of processing.

As described above, the embodiments provide an electronic apparatus including a first detector (e.g., video processor 5, audio processor 6, and controller 11) for receiving a video content, and attempting to detect a telop and a warning sound from the video content at a first image reading interval and a first sound reading interval, respectively; and a second detector (e.g., video processor 5, audio processor 6, and controller 11) which, if at least one of a telop and a warning sound is detected from the video content, attempts to detect a telop and a warning sound from the video content at a second image reading interval and a second sound reading interval which are shorter than the first image reading interval and the first sound reading interval, respectively.

The second image reading interval and the second sound reading interval are set in advance (e.g., in the flash memory 15) and are substituted for the first image reading interval and the first sound reading interval (e.g., according to an instruction from the controller 11) if at least one of a telop and a warning sound is detected by the first detector.

The electronic apparatus further includes a telop isolator (e.g., video processor 5 and controller 11) for isolating the detected telop from the video content if a telop is detected by the second detector.

The electronic apparatus further includes a warning sound isolator (e.g., audio processor 6 and controller 11) for isolating the detected warning sound from the video content if a warning sound is detected by the second detector.

The first detector (e.g., video processor 5, audio processor 6, and controller 11) again attempts to detect a telop and a warning sound if neither a telop nor a warning sound is detected by the second detector.

The electronic apparatus further includes a prompt report discriminator (e.g., video processor 5, audio processor 6, and controller 11) for judging whether a prompt report exists or not by multiplying a telop feature quantity and a warning sound feature quantity by respective preset weights.

Plural broadcast programs (see FIG. 7) which are broadcast by plural respective broadcasting stations are used as video contents.

With the above-described features, the embodiments make it possible to lower the degree of obstruction to viewing of a video content by a prompt report contained therein.

All the steps of the control process according to each embodiment can be implemented by software. Therefore, the advantages of each embodiment can easily be obtained merely by installing a program of the control process in an ordinary computer via a computer-readable storage medium that is stored with the program and running the installed program.

The invention is not limited to the above embodiments themselves and, in the practice stage, may be embodied in such a manner that constituent elements are modified in various manners without departing from the spirit and scope of the invention. And various inventive concepts may be conceived by properly combining plural constituent elements disclosed in each embodiment. For example, several ones of the constituent elements of each embodiment may be omitted. Furthermore, constituent elements of different embodiments may be combined as appropriate.

The invention claimed is:

1. An electronic apparatus, comprising:
    a processor configured to perform:
        a first detection process to detect a telop and a warning sound from a received video content at a first image reading interval and a first sound reading interval, respectively
        a second detection process to detect, upon a detection of at least one of the telop and the warning sound by the first detection process, a telop and a warning sound from the video content at a second image reading interval and a second sound reading interval which are shorter than the first image reading interval and the first sound reading interval, respectively; and
        a prompt report discrimination process to judge whether a prompt report exists or not by multiplying a telop feature quantity and a warning sound feature quantity by respective preset weights.

2. The apparatus of claim 1,
wherein, upon the detection of at least one of the telop and the warning sound by the first detection process, the processer performs the second detection process and terminates the first detection process.

3. The apparatus of claim 1,
wherein the processor is further configured to perform
    a telop isolation process to isolate, upon a detection of a telop by the second detection process, the detected telop from the video content.

4. The apparatus of claim 1,
wherein the processor is further configured to perform
    a warning sound isolation process to isolate, upon a detection of a warning sound by the sound detection process, the detected warning sound from the video content.

5. The apparatus of claim 2,
wherein, when neither a telop nor a warning sound is detected by the second detection process for a given time period, the processor again performs the first detection process and terminates the second detection process.

6. The apparatus of claim 1,
wherein the video content comprises a plurality of broadcast programs which are broadcast by respective broadcasting stations.

7. A control method of an electronic apparatus, the method comprising:
    receiving a video content;
    detecting a telop and a warning sound from the video content at a first image reading interval and a first sound reading interval, respectively; and
    detecting, upon a detection of at least one of the telop and the warning sound from the video content with the first image reading interval and the first sound reading interval, a telop and a warning sound from the video content at a second image reading interval and a second sound reading interval which are shorter than the first image reading interval and the first sound reading interval, respectively; and
    judging whether a prompt report exists or not by multiplying a telop feature quantity and a warning sound feature quantity by respective preset weights.

8. A non-transitory computer-readable medium storing a control program for controlling an electronic apparatus, the control program causing the electronic apparatus to execute a process, the process comprising:
    receiving a video content;
    detecting a telop and a warning sound from the video content at a first image reading interval and a first sound reading interval, respectively
    detecting, upon a detection of at least one of the telop and the warning sound from the video content with the first image reading interval and the first sound reading interval, a telop and a warning sound from the video content at a second image reading interval and a second sound reading interval which are shorter than the first image reading interval and the first sound reading interval, respectively; and
    judging whether a prompt report exists or not by multiplying a telop feature quantity and a warning sound feature quantity by respective preset weights.

* * * * *